United States Patent
Lin et al.

(10) Patent No.: US 10,477,523 B2
(45) Date of Patent: Nov. 12, 2019

(54) RESPONSE INFORMATION TRANSMISSION METHOD, SYSTEM AND DEVICE

(71) Applicant: CHINA ACADEMY OF TELECOMMUNICATIONS TECHNOLOGY, Beijing (CN)

(72) Inventors: Yanan Lin, Beijing (CN); Yu Ding, Beijing (CN); Xuejuan Gao, Beijing (CN); Zukang Shen, Beijing (CN); Xueming Pan, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 59 days.

(21) Appl. No.: 14/388,790

(22) PCT Filed: Mar. 4, 2013

(86) PCT No.: PCT/CN2013/072100
§ 371 (c)(1),
(2) Date: Sep. 26, 2014

(87) PCT Pub. No.: WO2013/143373
PCT Pub. Date: Oct. 3, 2013

(65) Prior Publication Data
US 2015/0085774 A1 Mar. 26, 2015

(30) Foreign Application Priority Data
Mar. 28, 2012 (CN) .......................... 2012 1 0086634

(51) Int. Cl.
*H04W 72/04* (2009.01)
*H04W 72/02* (2009.01)
(52) U.S. Cl.
CPC ..... *H04W 72/0413* (2013.01); *H04W 72/042* (2013.01); *H04W 72/02* (2013.01)

(58) Field of Classification Search
CPC ................................................. H04W 72/0413
See application file for complete search history.

(56) References Cited

U.S. PATENT DOCUMENTS

2011/0242982 A1 10/2011 Lunttila et al.
2012/0157143 A1* 6/2012 Tsunekawa ........... H04L 5/0058
455/509

(Continued)

FOREIGN PATENT DOCUMENTS

CN 101588224 A 11/2009
CN 101594683 A 12/2009

(Continued)

OTHER PUBLICATIONS

Machine Translation of CN 102355733 A, which was provided by the applicant in the IDS.*
Machine Translation of WO 2011/024646 A1.*
Machine Translation of WO 2011/134338 A1.*

(Continued)

*Primary Examiner* — Kevin M Cunningham
(74) *Attorney, Agent, or Firm* — Womble Bond Dickinson (US) LLP

(57) ABSTRACT

Disclosed are a response information transmission method, system and device. A base station can configure at least two PUCCH transmission carriers for user equipment, accordingly, the user equipment can select at least one PUCCH transmission carrier from the at least two PUCCH transmission carriers which are configured by the base station to transmit response information fed back on a corresponding subframe, and accordingly, the base station can receive the response information which is fed back by the user equipment on at least one PUCCH transmission carrier. The technical solution increases the number of PUCCH transmission carriers, so that compared with the manner of only configuring one PUCCH transmission carrier in the prior art, the reconfiguration operations caused by the movement of user equipment can be reduced, thereby reducing the con- (Continued)

dition that UE cannot normally communicate in the process of reconfiguration, and reducing the signaling overhead caused by the reconfiguration operation.

13 Claims, 6 Drawing Sheets

(56) References Cited

U.S. PATENT DOCUMENTS

| | | | | |
|---|---|---|---|---|
| 2013/0170462 A1* | 7/2013 | Seo | ............... | H04L 1/1861 370/329 |
| 2013/0250901 A1* | 9/2013 | Oizumi | ............ | H04W 72/12 370/329 |
| 2015/0131581 A1* | 5/2015 | Wei | ............ | H04W 72/0453 370/329 |
| 2015/0305016 A1* | 10/2015 | Dai | ............... | H04L 5/0053 370/280 |

FOREIGN PATENT DOCUMENTS

| | | | | |
|---|---|---|---|---|
| CN | 101702823 A | 5/2010 | | |
| CN | 102355733 A | 2/2012 | | |
| JP | WO 2011024646 A1 * | 3/2011 | ............ | H04W 72/06 |
| WO | WO 2011134338 A1 * | 11/2011 | ........ | H04W 72/0453 |

OTHER PUBLICATIONS

PCT International Search Report for PCT Counterpart Application No. PCT/CN2013/072100, 5 pages (including English translation), (dated May 23, 2013).
Texas Instruments, "On PUCCH for Multiple Component Carriers", 3GPP TSG RAN WG1 #58, R1-093171, 6 pages, (Aug. 24-28, 2009).
European Patent Office Communication enclosing Extended European Search Report for corresponding European Patent Appiication No. 13769384.2, 9 pp., (dated Feb. 16, 2015).
CMCC, "Discussion on Support of Different TDD UL-DL Configurations on Different Bands", 3GPP TSG-RAN WG1 #66bis, R1-113452, Zhuhai, China, 6 pp., (Oct. 10-14, 2011).
Mediatek Inc., "HARQ Feedback Mechanism in CA with Different TDD Configurations", 3GPP TSG-RAN WG1 Meeting #66, R1-112349, Athens, Greece, 5 pp., (Aug. 22-26, 2011).
PCT Written Opinion of the International Search Authority for PCT Counterpart Application No. PCT/CN2013/072100, 24 pp., (May 23, 2013).
PCT Notification Concerning Transmittal of International Preliminary Report on Patentability (Chapter I of the Patent Cooperation Treaty) for PCT Counterpart Appiloation No. PCT/CN2013/072100, 27 pp., (Oct. 9, 2014).
Office Action for corresponding Chinese Patent Application No. 201210066634.4, 8 pp., (Oct. 17, 2016).

* cited by examiner

--Prior Art--

--Prior Art--

RESPONSE INFORMATION TRANSMISSION METHOD, SYSTEM AND DEVICE

CROSS-REFERENCE TO RELATED APPLICATIONS

This patent application is a U.S. National Stage Application under 35 U.S.C. § 371 of International Application No. PCT/CN2013/072100, filed on Mar. 4, 2013, entitled RESPONSE INFORMATION TRANSMISSION METHOD, SYSTEM AND DEVICE, designating the United States, and claiming priority to Chinese Patent Application No. 201210086634.4, filed with the Chinese Patent Office on Mar. 28, 2012, and entitled "Method of and system and apparatus for transmitting response information", the content of which was incorporated by reference in its entirety.

FIELD

The present invention relates to the field of communications and particularly to a method of and system and apparatus for transmitting response information.

BACKGROUND

In a Long Term Evolution (LTE) system and earlier wireless communication systems, typically only one carrier is configured for a cell to transmit data. FIG. 1 illustrates a schematic diagram of a carrier in the LET system in which a bandwidth of the carrier is up to 200 MHz, where t represents the time domain and f represents the frequency domain.

Along with continuous evolution of the LTE system, in a Long Term Evolution-Advanced (LTE-A) system, there are required peak rates of the system, typically up to 1 Gbps in the downlink and 500 Mbps in the uplink, as improved significantly over the LTE system. Apparently the required peak rates of the LTE-A system can not be reached with only one carrier with a bandwidth up to 20 MHz. Thus in order to support a higher bandwidth of the system, it is necessary in the LTE-A system to extend a bandwidth available to a User Equipment (UE), and in view of this, Carrier Aggregation (CA) technology has been introduced where a plurality of consecutive or inconsecutive carriers served by the same base station (eNB) are aggregated together to serve the UE concurrently for providing a desirable rate, where the carriers aggregated together are referred to Component Carriers (CCs).

In the LTE-A system with the carrier aggregation, each cell can be a component carrier, and cells (or component carriers) served by different eNBs can not be aggregated. In order to ensure the UE in the LTE system to be able to operate over each of the aggregated carriers, each of the carriers has a bandwidth of no more than 20 MHz. FIG. 2 illustrates a schematic diagram of carrier aggregation in the LTE-A system, in which four carriers each with a bandwidth of 20 MHz are aggregated, where t represents the time domain and f represents the frequency domain. In the schematic diagram of carrier aggregation illustrated in FIG. 2, in the LTE-A system, four carriers, which can be aggregated, are served by the base station so that the base station can transmit data with the UE concurrently over the four carriers to thereby significantly extend the bandwidth of the system for an improved throughput of the system.

In the LTE system, a radio frame is 10 ms and a sub-frame is 1 ms in both the Frequency Division Duplex (FDD) mode and the Time Division Duplex (TDD) mode. Seven TDD uplink and downlink sub-frame configurations are defined for each TDD radio frame, particularly as depicted in Table 1 below, where D represents a downlink (DL) sub-frame, U represents an uplink (UL) sub-frame, and S represents a special sub-frame in the TDD system.

TABLE 1

(TDD uplink and downlink sub-frame configurations)

| Uplink and downlink configuration | Sub-frame index | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In the LTE system, a Hybrid Automatic Repeat ReQuest (HARQ) timing of a Physical Downlink Shared Channel (PDSCH) is further specified in details. Particularly in the LTE FDD system, the UE receives downlink data in the downlink sub-frame n−4 and feeds back, in the uplink sub-frame n, response information of whether the data in the downlink sub-frame needs to be retransmitted, the response information generally includes Acknowledge (ACK) or Negative-Acknowledge (NACK). With carrier aggregation, ACK/NACK information corresponding to a plurality of downlink carriers in the sub-frame n−4 will be fed back in the uplink sub-frame n concurrently. In the LTE TDD system, the UE may feed back, ACK/NACK information corresponding to a plurality of downlink sub-frames, in the same uplink sub-frame, that is, the UE detects transmission of a Physical Downlink Shared Channel (PDSCH), or a Physical Downlink Control Channel (PDCCH) indicating downlink semi-persistent scheduling to be released, in the downlink sub-frame n−k and feeds back corresponding ACK/NACK information in the uplink sub-frame n, where k∈K, and values in the set K depend upon an uplink and downlink sub-frame configuration of the TDD system and a particular sub-frame index, as depicted in Table 2. Particularly for a special sub-frame with a normal Cyclic Prefix (CP) configured with 0 and 5 and for a special sub-frame with an extended CP configured with 0 and 4, and there is no ACK/NACK feedback for the special sub-frame, that is, the UE will not feed back ACK/NACK for the special sub-frame.

TABLE 2 related TDD downlink K values: $\{k_0, k_1, \ldots k_{M-1}\}$

| Uplink and downlink configuration | \multicolumn{10}{c}{Sub-frame index} |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In a practical application, a plurality of radio frames are arranged in order, that is, if the last sub-frame in the radio frame a is k, then the first sub-frame in the radio frame a+1 is k+1, and Table 2, which takes only one radio frame as an example, depicts values of K corresponding to respective uplink sub-frames, where n−k<0 indicates a downlink sub-frame in a preceding radio frame.

In the LTE system, a solution to transmission of ACK/NACK information generally includes: transmitting ACK/NACK information over a Physical Uplink Control Channel (PUCCH). That is, the base station pre-configures the UE with a carrier over which the PUCCH is transmitted (referred to a PUCCH transmission carrier), and correspondingly the UE feeds back the ACK/NACK information over the PUCCH transmission carrier configured by the base station.

With the solution to transmission of ACK/NACK information above, the UE may move outside a coverage area of the PUCCH transmission carrier while the UE is moving due to the mobility of the UE, so that it is necessary for the base station to reconfigure the UE, however, the UE may not communicate normally on one hand in the reconfiguration procedure, and there will be an increase in signaling overhead due to reconfiguration operations.

SUMMARY

In view of this, embodiments of the invention provide a method of and system and apparatus for transmitting response information. With this technical solution, the number of reconfiguration operations on a UE by a base station can be lowered.

The embodiments of the invention are embodied as the following technical solutions:

An aspect of the embodiments of the invention provides a method of transmitting response information, the method including:

determining, by a base station, at least two Physical Uplink Control Channel (PUCCH) transmission carriers and notifying a User Equipment (UE) of the at least two PUCCH transmission carriers; and determining, by the base station, configuration information for PUCCH transmission by the UE and transmitting the configuration information to the UE.

Another aspect of the embodiments of the invention further provides a method of transmitting response information, the method including:

obtaining, by a User Equipment (UE), at least two Physical Uplink Control Channel (PUCCH) transmission carriers;

determining, by the UE, at least one of the at least two PUCCH transmission carriers in a sub-frame n for transmission of response information; and transmitting, by the UE, the response information over the determined PUCCH transmission carrier in the sub-frame n.

A further aspect of the embodiments of the invention provides a method of transmitting response information, the method including:

receiving, by a base station, response information transmitted by a User Equipment (UE) over at least one Physical Uplink Control Channel (PUCCH) transmission carrier in a sub-frame n;

wherein the PUCCH transmission carrier for transmission of the response information is determined from at least two PUCCH transmission carriers of which the UE is notified by the base station.

A further aspect of the embodiments of the invention provides an apparatus for transmitting response information, the apparatus including:

a PUCCH transmission carrier determination unit configured to determine at least two Physical Uplink Control Channel (PUCCH) transmission carriers;

a PUCCH transmission carrier notification unit configured to notify a User Equipment (UE) of the at least two PUCCH transmission carriers determined by the PUCCH transmission carrier determination unit;

a configuration information determination unit configured to determine configuration information for PUCCH transmission by the UE; and a configuration information transmission unit configured to transmit the configuration information determined by the configuration information determination unit to the UE.

A further aspect of the embodiments of the invention provides an apparatus for transmitting response information, the apparatus including:

an obtainment unit configured to obtain at least two Physical Uplink Control Channel (PUCCH) transmission carriers;

a PUCCH transmission carrier determination unit configured to determine at least one of the at least two PUCCH transmission carriers, obtained by the obtainment unit, in a sub-frame n for transmission of response information; and a response information transmission unit configured to transmit the response information over the PUCCH transmission carrier determined by the PUCCH transmission carrier determination unit in the sub-frame n.

A further aspect of the embodiments of the invention provides an apparatus for transmitting response information, the apparatus including:

a PUCCH transmission carrier determination unit configured to determine at least one Physical Uplink Control Channel (PUCCH) transmission carrier for transmission of response information by a UE, wherein the PUCCH transmission carrier for transmission of response information is determined from at least two PUCCH transmission carriers of which the UE is notified by a base station; and an response information reception unit configured to receive the response information transmitted from the UE over the at least one PUCCH transmission carrier in a sub-frame n.

A further aspect of the embodiments of the invention provides a system for transmitting response information, the system including:

a base station and a User Equipment (UE), wherein:

the base station is configured to determine at least two Physical Uplink Control Channel (PUCCH) transmission carriers, to notify the UE of the at least two PUCCH transmission carriers, to determine configuration information for PUCCH transmission by the UE, to transmit the configuration information to the UE and to receive response information transmitted from the UE in at least one of the PUCCH transmission carriers in a sub-frame n; and the UE is configured to obtain the at least two PUCCH transmission carriers, to determine the at least one of the at least two PUCCH transmission carriers in the sub-frame n for transmission of response information and to transmit the response information over the determined PUCCH transmission carrier in the sub-frame n.

With at least one of the technical solutions above according to the embodiments of the invention, the base station can configure the UE with at least two PUCCH transmission carriers, and correspondingly the UE can select at least one of the at least two PUCCH transmission carriers configured by the base station for transmission of response information to be fed back in a corresponding sub-frame. Thus the base station can receive the response information fed back by the UE over the at least one PUCCH transmission carrier. Compared with the prior art in which only one PUCCH transmission carrier is configured, in this technical solution, an number of PUCCH transmission carriers is increased, the number of reconfiguration operations due to the moving UE can be lowered, and consequently the number of occurrences, that the UE fails to communication normally in the reconfiguration procedure, can be lowered and a signaling overhead due to the reconfiguration operations can be lowered.

Other features and advantages of the invention will be set forth in the following description and will partly become apparent from the description or can be learned from the practice of the invention. The objects and other advantages of the invention can be achieved and attained from the structure pointed out particularly in the written description, the claims and the drawings.

BRIEF DESCRIPTION OF THE DRAWINGS

The drawings are intended to provide further understanding of the invention, constitute a part of the description and together with the embodiments of the invention to describe the invention but will not limit the invention. In the drawings.

DETAILED DESCRIPTION OF THE EMBODIMENTS

In order to provide a solution for reducing reconfiguration operations on a UE by a base station, embodiments of the invention provide a method of and system and apparatus for transmitting response information. Preferred embodiments of the invention will be described below with reference to the drawings, but it shall be appreciated that the preferred embodiments described here are merely intended to illustrate and describe but not to limit the invention, and the embodiments in this application and the features in the embodiments can be combined with each other as long as they have no confliction with each other.

First Embodiment

A first embodiment of the invention provides a method of transmitting response information, which can particularly include ACK/NACK, and with this transmission method, the number of reconfiguration operations on a UE by a base station can be lowered.

In the first embodiment, a process of transmitting response information generally involves a configuration procedure by the base station, a procedure of UE transmitting the response information based upon the configuration by the base station and a procedure of the base station receiving the response information, and these three procedures will be described below in details respectively.

I. Configuration Procedure by Base Station

Figure 3:
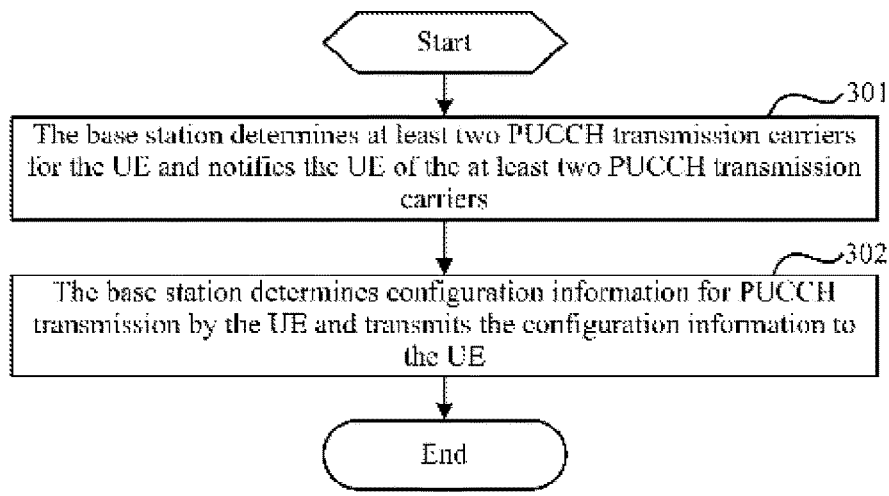
FIG. 3 is a schematic diagram of a configuration procedure by a base station according to a first embodiment of the invention.

FIG. 3 illustrates a schematic diagram of a configuration procedure by a base station, and as illustrated in FIG. 3, the configuration procedure by the base station generally includes:

In the step 301, the base station determines at least two PUCCH transmission carriers for the UE and notifies the UE of the at least two PUCCH transmission carriers.

Where the base station notifies the UE of the at least two PUCCH transmission carriers, that is, the base station notifies the UE of information about the at least two PUCCH transmission carriers, e.g., carrier indexes thereof.

In the step 302, the base station determines configuration information for PUCCH transmission by the UE and transmits the configuration information to the UE.

Where the configuration information includes related configuration which indicates UE to transmit PUCCH, for example, PUCCH resources occupied by response information transmitted over the PUCCH transmission carriers.

The configuration procedure by the base station has ended so far. It shall be appreciated that the step 301 and the step 302 above may not be performed in a sequential order, but firstly the step 302 and then the step 301 can be performed or the step 301 and the step 302 above can be performed concurrently in a practical application.

With the corresponding configuration procedure above in FIG. 3, compared with the prior art in which only one PUCCH transmission carrier is configured, the base station can configure the UE with at least two PUCCH transmission carriers so that the number of reconfiguration operations due to the moving UE and consequently a signaling overhead due to the reconfiguration procedure can be lowered.

Preferably in the step 301 above, the at least two PUCCH transmission carriers determined by the base station include a first PUCCH transmission carrier. Particularly the first PUCCH transmission carrier can be an uplink primary carrier or the carrier with the largest coverage radius among a plurality of uplink carriers aggregated for the UE.

Preferably when the base station configures the determined at least two PUCCH transmission carriers respectively with priorities, that is, the at least two PUCCH transmission carriers determined by the base station correspond respectively to different priorities, the priority corresponding to the first PUCCH transmission carrier is the lowest.

With the configuration procedure above, the base station configures the first PUCCH transmission carrier of the at least two PUCCH transmission carriers to correspond to a primary carrier or a carrier with the largest coverage radius among the plurality of uplink carriers aggregated for the UE, and configures the first PUCCH transmission carrier with the lowest priority, so that when the UE selects a PUCCH transmission carrier for transmission of response information according to the priorities corresponding respectively to the at least two PUCCH transmission carriers notified of by the base station, the first PUCCH transmission carrier can be avoided from being selected as much as possible, thus the transmit power of PUCCH transmission by the UE is lowered to some extent and thereby the power consumption of the UE is saved.

Preferably in the step 301 above, the base station can notify the UE of the determined at least two PUCCH transmission carriers as follows:

The base station notifies the UE of the determined at least two PUCCH transmission carriers in higher-layer signaling, where the higher-layer signaling includes Radio Resource Control (RRC) signaling and PDCCH signaling. Particularly the base station can notify the UE of the determined at least two PUCCH transmission carriers in the higher-layer signaling in both the RRC signaling and the PDCCH signaling.

Preferably in the step 302 above, the configuration information determined by the base station can particularly include the following information:

Information about a set of downlink carriers corresponding to each of the at least two PUCCH transmission carriers determined by the base station; and/or Priority information corresponding respectively to the at least two PUCCH transmission carriers determined by the base station.

Preferably in the step 302 above, the base station can transmit the determined configuration information to the UE as follows:

The base station transmits the configuration information to the UE in higher-layer signaling and/or downlink control signaling.

That is, the base station can transmit all the configuration information to the UE in the higher-layer signaling or the downlink control signaling, or the base station can transmit one part of the configuration information to the UE in the higher-layer signaling and the other part of the configuration information to the UE in the downlink control signaling. The higher-layer signaling can be RRC signaling or PDCCH signaling, and the downlink control signaling can be PDCCH signaling.

Preferred Embodiment of Configuration by Base Station

In a preferred embodiment, the base station can preferably configure two PUCCH transmission carriers, that is, the base station configures the UE with a first PUCCH transmission carrier and a second PUCCH transmission carrier, and preferably the second PUCCH transmission carrier is a secondary carrier or a carrier with a smallest coverage radius among the plurality of uplink carriers aggregated for the UE.

Furthermore the base station configures PUCCH resources, for transmission of ACK/NACK, on the first PUCCH transmission carrier and the second PUCCH transmission carrier respectively and can notify the UE of information about the configured PUCCH resources in an explicit or implicit scheme, where:

The information is notified of explicitly, that is, the information is notified of in higher-layer signaling, e.g., RRC signaling or PDCCH signaling or RRC signaling in combination with PDCCH signaling; and The information is notified of implicitly, that is, the information is notified of as in a scheme prescribed with the UE, for example, according to the CCE indexes occupied by the PDCCH by which the PDSCH is scheduled, the UE can calculate corresponding PUCCH resource indexes by a predefined scheme to determine the first PUCCH transmission carrier and the second PUCCH transmission carrier.

Preferably the PHCCH resources configured for the different PUCCH transmission carriers can be notified of in the same or different schemes. More preferably, if the PHCCH resources configured for the different PUCCH transmission carriers are notified of in different schemes, then the PUCCH transmission carrier which is a primary carrier can be notified implicitly as described above, and the PUCCH transmission carrier which is a secondary carrier can be notified explicitly as described above.

The configuration procedure by the base station has generally been described above in details, and the procedure of UE transmitting response information based upon the configuration by the base station will be further described below in details.

II. Procedure of UE Transmitting Response Information Based upon Configuration by Base Station The UE needs to obtain in advance the at least two PUCCH transmission carriers configured by the base station and the configuration information for PUCCH transmission configured by the base station. Particularly the UE obtains the at least two PUCCH transmission carriers configured by the base station, that is, obtains the information about the at least two PUCCH transmission carriers configured by the base station. The obtainment scheme corresponds to the notification scheme of the base station, that is, if the base station transmits the determined at least two PUCCH transmission carriers in the higher-layer signaling, then the UE obtains the at least two PUCCH transmission carriers in the corresponding higher-layer signaling. The obtainment scheme of the configuration information corresponds to the transmission scheme of the base station, that is, if the base station transmits the configuration information in the higher-layer signaling, then the UE receives the configuration information from the corresponding higher-layer signaling, and if the base station transmits the configuration information in the downlink control signaling, then the UE receives the configuration information from the corresponding downlink control signaling.

Preferably the configuration information, transmitted from the base station, received by the UE can include the information about the set of downlink carriers corresponding to each of the at least two PUCCH transmission carriers and/or the priority information corresponding respectively to the at least two PUCCH transmission carriers.

Figure 4:
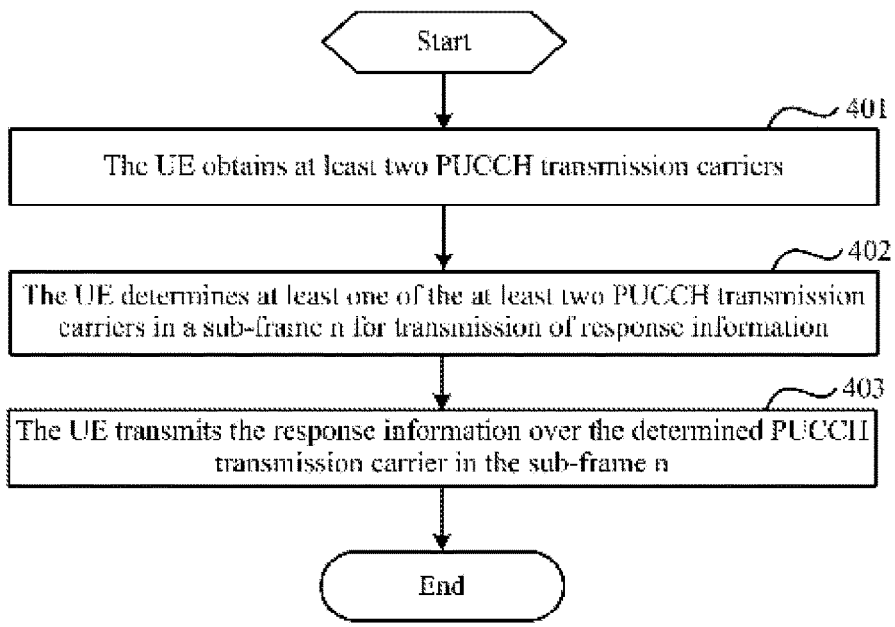
FIG. 4 is a schematic diagram of UE transmitting response information based upon the configuration by the base station according to the first embodiment of the invention.

FIG. 4 illustrates a schematic diagram of UE transmitting response information based upon a configuration by a base station, and as illustrated in FIG. 4, a procedure of UE transmitting response information based upon the configuration by the base station generally includes:

In the step 401, the UE obtains at least two PUCCH transmission carriers.

Where the UE obtains information about the at least two PUCCH transmission carriers generally in a scheme corresponding to the scheme in which the base station notifies of the PUCCH transmission carriers.

Preferably the at least two PUCCH transmission carriers obtained by the UE includes a first PUCCH transmission carrier which is an uplink primary carrier or a carrier with a largest coverage radius among a plurality of uplink carriers aggregated for the UE. More preferably the at least two PUCCH transmission carriers obtained by the UE correspond respectively to two different priorities, and the priority corresponding to the first PUCCH transmission carrier is the lowest.

In the step 402, the UE determines at least one of the at least two PUCCH transmission carriers in a sub-frame n for transmission of response information.

In the step 403, the UE transmits the response information over the determined PUCCH transmission carrier in the sub-frame n.

The flow of UE transmitting response information based upon the configuration by the base station has ended so far.

With the corresponding configuration procedure above in FIG. 4, compared with the prior art in which only one PUCCH transmission carrier is configured, the UE can select at least one of the at least two PUCCH transmission carriers configured by the base station for a feed back of response information, so that the number of reconfiguration operations due to the moving UE and consequently a signaling overhead due to the reconfiguration procedure can be lowered.

Preferably before the step 403 above is performed, that is, before the response information is transmitted over the determined PUCCH transmission carrier in the sub-frame n, the UE can further perform the following procedure:

In a procedure 1, the UE receives the configuration information transmitted from the base station, where the configuration information includes PUCCH resources on the PUCCH transmission carriers; and/or In a procedure 2, the UE determines PUCCH resources on the PUCCH transmission carriers according to Control Channel Element (CCE) indexes, where the CCE indexes are indexes of CCEs occupied by a PDCCH by which the base station schedules a PDSCH.

Particularly in the configuration procedure by the base station, if the base station notifies of the configured PUCCH resources explicitly, then the UE performs only the procedure 1 above; in the configuration procedure by the base station, if the base station notifies of the configured PUCCH resources implicitly, then the UE performs only the procedure 2 above; or in the configuration procedure by the base station, if the base station notifies of the configured PUCCH resources both explicitly and implicitly, then the UE needs to perform both the procedure 1 and the procedure 2 above.

Preferably before the step 402 above is performed, that is, before the UE determines at least one of the at least two PUCCH transmission carriers for transmission of response information, the UE can further perform a procedure of determining the response information to be fed back in the sub-frame n, and particularly the procedure includes:

The UE determines sub-frames to transmit response information corresponding to respective downlink sub-frames over each downlink carrier, where different downlink carriers correspond to one or more response information feedback timing relationships; and The UE determines response information to be fed back in corresponding sub-frames n according to downlink data received over the downlink sub-frames of the respective downlink carriers.

In order to better understand the procedure above of determining the response information to be fed back in the sub-frame n, a description thereof will be given below by way of a particular example:

The UE determines a downlink sub-frame m for which response information (i.e., ACK/NACK information) needs to be fed back in the sub-frame n according to different response information feedback timing relationships (e.g., PDSCH ACK/NACK feedback timing relationships) over different carriers; and the UE determines a downlink sub-frame m for which ACK/NACK information needs to be fed back in the sub-frame n according to a response information feedback timing relationship (e.g., a PDSCH ACK/NACK feedback timing relationship) over different carriers, where m=n−4 for an FDD carrier; and m=n−k for a TDD carrier, where k∈K, and K is as depicted in Table 2.

Preferably in the step 402 above, the UE can determine at least one of the at least two PUCCH transmission carriers in the sub-frame n for transmission of response information in any of the following schemes:

First Scheme

The UE selects, from the at least two PUCCH transmission carriers, the PUCCH transmission carrier with the sub-frame n being an uplink sub-frame and with a highest priority as a PUCCH transmission carrier for transmission of response information.

Where the priorities of the PUCCH transmission carriers are configured by the base station in higher-layer signaling (that is, determined from the configuration information from the base station) or preset by the system.

In the first scheme, the UE can determine a PUCCH transmission carrier for transmission of response information, that is, the UE transmits the response information over at most one PUCCH transmission carrier in the uplink sub-frame n. For example the base station configures two PUCCH transmission carriers, where the second PUCCH transmission carrier is a secondary carrier or a carrier with a smaller coverage radius, and the priority of the second PUCCH transmission carrier is higher than that of the first PUCCH transmission carrier, then when the UE determines the PUCCH transmission carrier for transmission of response information, the UE firstly judges whether the sub-frame n included over the second PUCCH transmission carrier corresponds to an uplink sub-frame, and if so, then the UE transmits the response information over the second PUCCH transmission carrier; otherwise, the UE transmits the response information over the first PUCCH transmission carrier. If the base station configures at least three PUCCH transmission carriers, then the UE determines a PUCCH transmission carrier, including the sub-frame n being an uplink sub-frame and with the highest priority, as a PUCCH transmission carrier for transmission of response information, in a descending order of priorities according to the priorities of the PUCCH transmission carriers.

Second Scheme

The UE obtains sets of downlink carriers corresponding to the respective PUCCH transmission carriers and selects, from the at least two PUCCH transmission carriers, the PUCCH transmission carrier, with the corresponding set of downlink carriers including carriers for which response information needs to be fed back in the sub-frame n and with the highest priority, as a PUCCH transmission carrier for transmission of response information.

Where the sets of downlink carriers corresponding to the respective PUCCH transmission carriers are configured by the base station in the configuration information, and the priorities of the PUCCH transmission carriers are configured by the base station in higher-layer signaling or preset by the system.

In the second scheme, the UE can determine a PUCCH transmission carrier for transmission of response information, that is, the UE the response information over at most one PUCCH transmission carrier in the uplink sub-frame n.

Third Scheme

The UE obtains respective sets of downlink carriers corresponding to the respective PUCCH transmission carriers, and when response information needs to be fed back in the sub-frame n for carriers in some sets of downlink carriers, the UE determines the PUCCH transmission carriers corresponding to the sets of downlink carriers as PUCCH transmission carriers for transmission of response information.

In the third scheme, the UE can determine at least one PUCCH transmission carrier for transmission of response information, that is, the UE transmits the response information over at least one PUCCH transmission carrier in the uplink sub-frame n. For example, the base station configures a first PUCCH transmission carrier and a second PUCCH transmission carrier, and configures the first PUCCH transmission carrier to correspond to a first category of set of downlink carriers (which can include primary carriers or carriers with larger coverage radiuses, e.g., a set of FDD downlink carriers) and the second PUCCH transmission carrier to correspond to a second category of set of downlink carriers (e.g., a set of TDD downlink carriers), so that in the uplink sub-frame n:

When response information needs to be fed back in the sub-frame n for carriers in the first category of set of downlink carriers, the UE determines the first PUCCH transmission carrier as a PUCCH transmission carrier for transmission of response information; and When response information needs to be fed back in the sub-frame n for carriers in the second category of set of downlink carriers, the UE determines the second PUCCH transmission carrier as a PUCCH transmission carrier for transmission of response information.

In the second scheme and the third scheme, the base station can configure only the first PUCCH transmission carrier of the at least two PUCCH transmission carriers with a corresponding first set of carriers, and when response information needs to be fed back in the sub-frame n for carriers in the first set of carriers, then the UE determines the first PUCCH transmission carrier as a PUCCH transmission carrier for transmission of response information; otherwise, the UE determines the PUCCH transmission carrier with the highest priority among the other PUCCH transmission carriers as a PUCCH transmission carrier for transmission of response information. For example, the base station configures the first PUCCH transmission carrier with a corresponding first set of carriers, wherein the first set of carriers can include downlink primary carriers or downlink carriers with larger coverage radiuses, so that in the uplink sub-frame n:

When response information needs to be fed back in the sub-frame n for carriers in the first category of set of downlink carriers, that is, the UE feeds back in the uplink sub-frame n only ACK/NACK information corresponding to downlink carriers in the first set of downlink carriers, the UE determines the first PUCCH transmission carrier as a PUCCH transmission carrier for transmission of response information; and When response information needs to be fed back in the sub-frame n for other carriers than the first category of set of downlink carriers or response information needs to be fed back in the sub-frame n for both carriers in the first category of set of downlink carriers and other carriers than the first category of set of downlink carriers, the UE determines, among the at least two PUCCH transmission carriers, the PUCCH transmission carriers other than the first PUCCH transmission carrier as a PUCCH transmission carrier(s) for transmission of response information.

Particularly when UE determines, from the at least two PUCCH transmission carriers, at least one for transmission of response information in the sub-frame n, the UE can adopt the first scheme, the second scheme or the third scheme to determine the at least one PUCCH transmission carrier for transmission of response information in the sub-frame n. Preferably when the base station configures only the priorities corresponding respectively to the respective PUCCH transmission carriers in the configuration information, the UE can determine at least one of the at least two PUCCH transmission carriers for transmission of response information in the sub-frame n in the first scheme above; when the base station configures the at least two PUCCH transmission carriers respectively with the corresponding sets of downlink carriers in the configuration information, the third scheme above can be applied; or when the base station configures the at least two PUCCH transmission carriers respectively with the corresponding sets of downlink carriers in the configuration information and with the corresponding priorities, the second scheme above can be applied.

The scheme of determining a PUCCH transmission carrier for transmission of response information in the sub-frame n according to the contents in the configuration information transmitted from the base station has been described above only by way of an example, and in a practical application, alternatively the base station can in advance prescribe with the UE a scheme of determining at least one PUCCH transmission carrier for transmission of response information in the sub-frame n, and in this case, the configuration information configured by the base station needs to include at least information required for determining a PUCCH transmission carrier for transmission of response information in the sub-frame n in the prescribed scheme, for example, if the base station and the UE prescribe to adopt the second scheme above, then the configuration information needs to include at least the sets of downlink carriers corresponding to the respective PUCCH transmission carriers and the priorities information respectively corresponding to the respective PUCCH transmission carriers.

Figure 5:
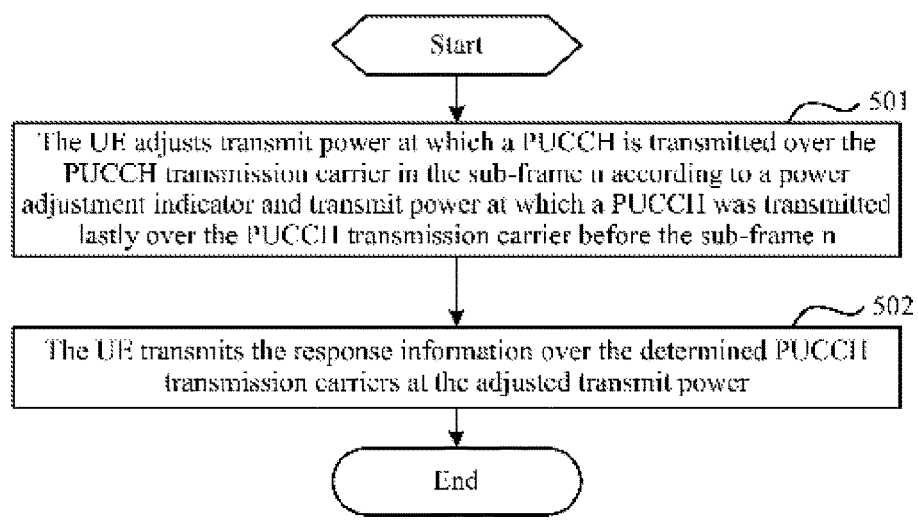
FIG. 5 a schematic diagram of UE transmitting the response information over a determined PUCCH transmission carrier according to the first embodiment of the invention.

Preferably in the step 403 above, that is, the UE can transmit the response information over the determined PUCCH transmission carrier in the sub-frame n in the following steps as illustrated in FIG. 5:

In the step 501, the UE adjusts transmit power at which a PUCCH is transmitted over the each determined PUCCH transmission carrier in the sub-frame n according to a received power adjustment indicator and transmit power at which a PUCCH is transmitted lastly over the corresponding PUCCH transmission carrier before the sub-frame n.

Where the power adjustment indicator is an indicator configured by the base station to adjust transmit power of a PUCCH in the sub-frame n.

In the step 502, the UE transmits the response information over the determined PUCCH transmission carriers at the adjusted transmit power.

The flow of UE transmitting response information over the determined PUCCH transmission carrier has ended so far.

Figure 6:
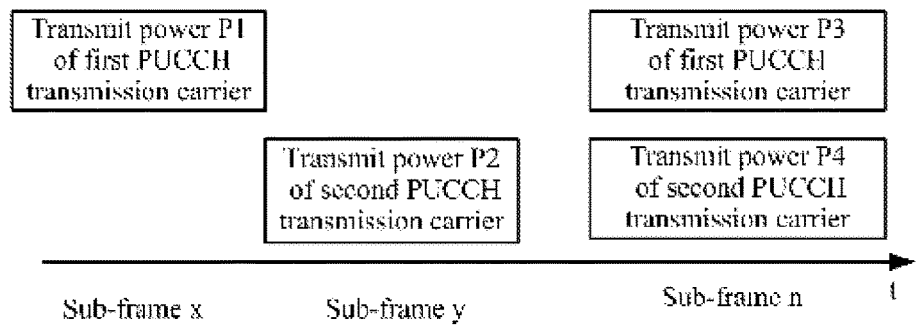
FIG. 6 is a schematic diagram of adjusting transmit power according to the first embodiment of the invention.

In the corresponding flow in FIG. 5, upon reception of the power adjustment indicator transmitted from the base station, the UE adjusts the transmit power according to the transmit power at which a PUCCH was transmitted lastly over the corresponding PUCCH transmission carrier. Particularly FIG. 6 illustrates a schematic diagram of adjusting transmit power, and as illustrated in FIG. 6, in the time domain t, transmit power P3 over the first PUCCH transmission carrier in the sub-frame n is adjusted based upon transmit power P1 over the first PUCCH transmission carrier in the sub-frame x, where no PUCCH is transmitted over the first PUCCH transmission carrier between the sub-frame x and the sub-frame n; and transmit power P4 over the second PUCCH transmission carrier in the sub-frame n is adjusted based upon transmit power P2 over the second PUCCH transmission carrier in the sub-frame y, where no PUCCH is transmitted over the second PUCCH transmission carrier between the sub-frame y and the sub-frame n.

Where the UE can receive the power adjustment indicator in a scheme corresponding to a scheme in which the base station transmits the power adjustment indicator, particularly in the following several schemes:

The UE receives the power adjustment indicator in all the downlink sub-frames for which ACK/NACK information is fed back in the sub-frame n, and this scheme is generally applicable to the first scheme in which the UE determines the PUCCH transmission carrier for transmission of response information in the sub-frame n; or The UE receives the power adjustment indicator over the carriers included in the configured sets of downlink carriers, and this scheme is generally applicable to the second or third scheme in which the UE determines the PUCCH transmission carrier for transmission of response information in the sub-frame n.

The procedure of UE transmitting response information based upon the configuration by the base station has generally been described above in details, and the procedure of base station receiving response information will be further described below in details.

III. Procedure of Base Station Receiving Response Information

Figure 7:
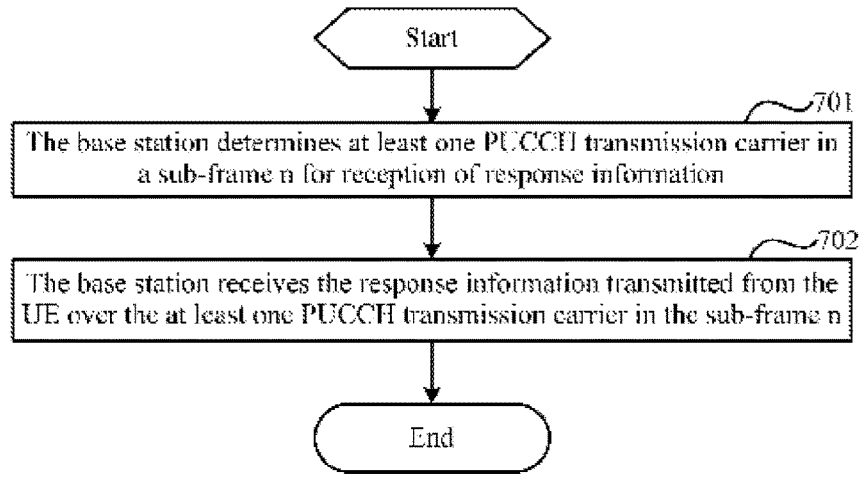
FIG. 7 is a schematic diagram of base receiving the response information according to the first embodiment of the invention.

FIG. 7 illustrates a schematic diagram of base station receiving response information, and as illustrated in FIG. 7, the procedure of the base station receiving response information by generally includes the following steps:

In the step 701, the base station determines at least one PUCCH transmission carrier for reception of response information in a sub-frame n.

Where the PUCCH transmission carrier for transmission of response information is determined from at least two PUCCH transmission carriers of which a UE is notified by the base station.

In the step 702, the base station receives, in the sub-frame n, the response information transmitted from the UE over the at least one PUCCH transmission carrier.

The flow of the base station receiving response information has ended so far.

In the corresponding reception procedure above in FIG. 7, the base station can receive response information fed back by the UE over at least one PUCCH transmission carrier, so that the number of reconfiguration operations due to the moving user equipment and consequently a signaling overhead due to the reconfiguration procedure can be lowered as compared with the prior art in which only one PUCCH transmission carrier is configured.

Preferably in the step 701 above, the scheme in which the base station determines at least one PUCCH transmission carrier for reception of response information in the sub-frame n is the same as the scheme in which the UE determines at least one PUCCH transmission carrier for transmission of response information in the sub-frame n.

Preferably in the step 702 above, the base station can receive the response information transmitted from the UE over the at least one PUCCH transmission carrier in the sub-frame n in any of the following schemes:

First Scheme

The base station receives the response information over the PUCCH transmission carrier with the sub-frame n being an uplink sub-frame and with the highest priority among the at least two PUCCH transmission carriers, where the priorities are configured by the base station in higher-layer signaling or preset by the system, or when feedback response information corresponding to scheduled downlink data is transmitted in the sub-frame n, the base station receives the feedback response information over the PUCCH transmission carrier with the sub-frame n being an uplink sub-frame and with the highest priority among the at least two PUCCH transmission carriers, where the priorities are configured by the base station in higher-layer signaling or preset by the system.

The first scheme above corresponds to the first scheme in which the UE determines at least one PUCCH transmission carrier for transmission of response information in the sub-frame n. For example, the base station configures two PUCCH transmission carriers, where in the case the second PUCCH transmission carrier is a secondary carrier or a carrier with a smaller coverage radius, and the priority of the second PUCCH transmission carrier is higher than that of the first PUCCH transmission carrier, if the sub-frame n over the second PUCCH transmission carrier corresponds to an uplink sub-frame, then the base station receives all the ACK/NACK information over the second PUCCH transmission carrier; otherwise, the base station receives all the ACK/NACK information over the first PUCCH transmission carrier, dependent upon the scheme in which the UE determines a PUCCH transmission carrier for transmission of response information in the corresponding case.

Second Scheme

The base station receives the response information over the PUCCH transmission carrier with the highest priority among PUCCH transmission carriers corresponding to a set of downlink carriers to schedule data transmission and for which corresponding feedback response information is transmitted in the sub-frame n, where the priorities are configured by the base station in higher-layer signaling or preset by the system.

The second scheme above corresponds to the second scheme in which the UE determines at least one PUCCH transmission carrier for transmission of response information in the sub-frame n.

Third Scheme

The base station receives the response information respectively over PUCCH transmission carriers corresponding to sets of downlink carriers to schedule data transmission and for which corresponding feedback response information is transmitted in the sub-frame n.

The third scheme above corresponds to the third scheme in which the UE determines at least one PUCCH transmission carrier for transmission of response information in the sub-frame n. For example, in the case that the base station configures a first PUCCH transmission carrier and a second PUCCH transmission carrier, and configures the first PUCCH transmission carrier to correspond to a first category of set of downlink carriers (which can include primary carriers or carriers with larger coverage radiuses, e.g., a set of FDD downlink carriers) and the second PUCCH transmission carrier to correspond to a second category of set of downlink carriers (e.g., a set of TDD downlink carriers), if the base station schedules data transmission only over the first category of set of downlink carriers, then the base station receives ACK/NACK information over the first PUCCH transmission carrier; or if the base station schedules data transmission over carriers in the second category of set of downlink carriers, then the base station receives ACK/NACK information over the second PUCCH transmission carrier, dependent upon the scheme in which the UE determines a PUCCH transmission carrier for transmission of response information in the corresponding case.

With the technical solution above according to the first embodiment of the invention, the base station configures the UE with at least two PUCCH transmission carriers and preferably configures one of the PUCCH transmission carriers to be a carrier with a smaller coverage radius, so that the UE can continues with operating over the carrier with a larger coverage radius after moving away from the coverage area of the carrier with a smaller coverage radius to thereby ensure normal operation of the UE.

Second Embodiment

In correspondence to the method of transmitting response information according to the first embodiment above, a second embodiment of the invention provides an apparatus for transmitting response information, and with the apparatus, the number of reconfiguration operations on a UE by a base station can be lowered.

Figure 8:
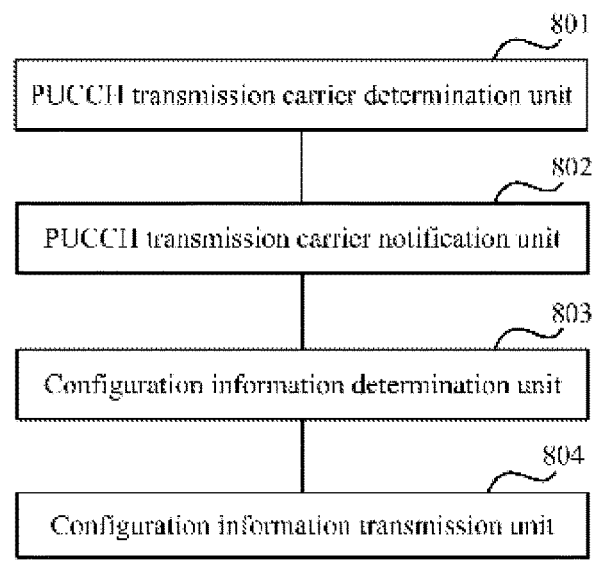
FIG. 8 is a schematic structural diagram of an apparatus for transmitting response information according to a second embodiment of the invention.

FIG. 8 illustrates a schematic structural diagram of an apparatus for transmitting response information according to the second embodiment, and as illustrated in FIG. 8, the apparatus for transmitting response information generally includes:

A PUCCH transmission carrier determination unit 801, a PUCCH transmission carrier notification unit 802, a configuration information determination unit 803 and a configuration information transmission unit 804;

Where:

The PUCCH transmission carrier determination unit 801 is configured to determine at least two Physical Uplink Control Channel (PUCCH) transmission carriers;

The PUCCH transmission carrier notification unit 802 is configured to notify a UE of the at least two PUCCH transmission carriers determined by the PUCCH transmission carrier determination unit 801;

The configuration information determination unit 803 is configured to determine configuration information for PUCCH transmission by the UE; and The configuration information transmission unit 804 is configured to transmit the configuration information determined by the configuration information determination unit 803 to the UE.

Preferably the PUCCH transmission carrier notification unit 802 included in the apparatus illustrated in FIG. 8 is further configured to notify the UE of the at least two PUCCH transmission carriers in higher-layer signaling.

Preferably the configuration information transmission unit 804 included in the apparatus illustrated in FIG. 8 is further configured to transmit the configuration information from a base to the UE in higher-layer signaling and/or downlink control signaling.

Preferably the PUCCH transmission carrier determination unit 801 included in the apparatus illustrated in FIG. 8 is further configured to determine that the at least two PUCCH transmission carriers include a first PUCCH transmission carrier, wherein the first PUCCH transmission carrier is an uplink primary carrier or a carrier with a largest coverage radius among a plurality of uplink carriers aggregated for the UE.

Preferably the PUCCH transmission carrier determination unit 801 included in the apparatus illustrated in FIG. 8 is configured to determine that the at least two PUCCH transmission carriers correspond respectively to different priorities and the priority corresponding to the first PUCCH transmission carrier is the lowest.

Preferably the configuration information determination unit 803 included in the apparatus illustrated in FIG. 8 is configured to determine information about a set of downlink carriers corresponding to each of the at least two PUCCH transmission carriers; and/or to determine priority information corresponding respectively to the at least two PUCCH transmission carriers.

The corresponding apparatus for transmitting response information in FIG. 8 can be located in a base station, and when the apparatus is located in the base station, it is generally configured to perform the configuration procedure by the base station, which corresponds to the configuration procedure by the base station according to the first embodiment above.

The corresponding apparatus for transmitting response information in FIG. 8 is further provided with functional modules to perform the corresponding steps in the configuration procedure by the base station according to the first embodiment, so a repeated description thereof will be omitted here.

Figure 9:
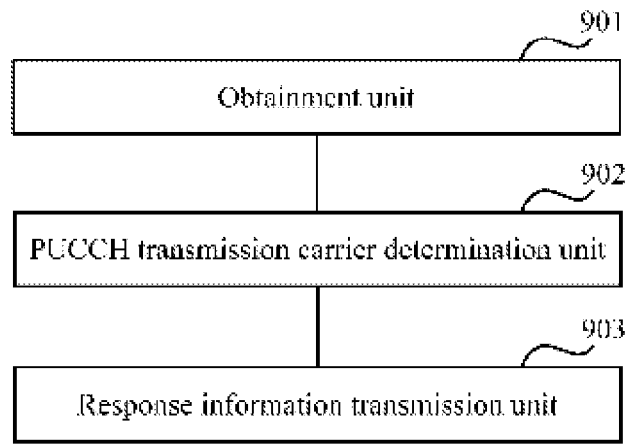
FIG. 9 is another schematic structural diagram of an apparatus for transmitting response information according to the second embodiment of the invention.

FIG. 9 illustrates a schematic structural diagram of an apparatus for transmitting response information according to the second embodiment, and as illustrated in FIG. 9, the apparatus for transmitting response information generally includes:

An obtainment unit 901, a PUCCH transmission carrier determination unit 902 and a response information transmission unit 903;

Where:

The obtainment unit 901 is configured to obtain at least two Physical Uplink Control Channel (PUCCH) transmission carriers;

The PUCCH transmission carrier determination unit 902 is configured to determine at least one of the at least two PUCCH transmission carriers, obtained by the obtainment unit 901, in a sub-frame n for transmission of response information; and The response information transmission unit 903 is configured to transmit the response information over the PUCCH transmission carrier determined by the PUCCH transmission carrier determination unit 902 in the sub-frame n.

Preferably the obtainment unit 901 included in the apparatus illustrated in FIG. 9 is configured to receive configuration information transmitted from a base station, where the configuration information includes PUCCH resources over the PUCCH transmission carriers; and/or to determine PUCCH resources over the PUCCH transmission carriers according to Control Channel Element (CCE) indexes, where the CCE indexes are indexes of CCEs occupied by a PDCCH by which the base station schedules a Physical Downlink Shared Channel (PDSCH).

Figure 10:
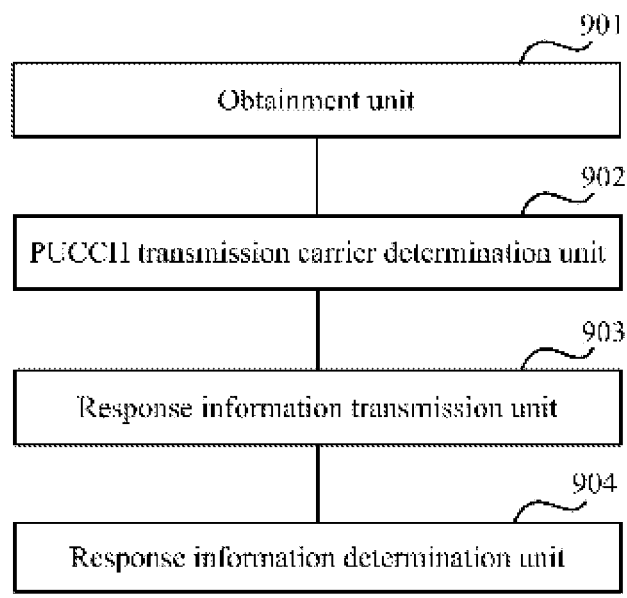
FIG. 10 is a further schematic structural diagram of an apparatus for transmitting response information according to the second embodiment of the invention.

As illustrated in FIG. 10, preferably the apparatus illustrated in FIG. 9 can further include:

A response information determination unit 904 is configured to determine sub-frames to transmit response information corresponding to respective downlink sub-frames over each downlink carrier, where different downlink carriers correspond to one or more response information feedback timing relationships, and to determine response information to be fed back in corresponding transmitting sub-frames n according to downlink data received over the downlink sub-frames of the respective downlink carriers.

Preferably the obtainment unit 901 included in the apparatus illustrated in FIG. 9 or FIG. 10 is configured to receive the at least two PUCCH transmission carriers notified of by a base station in higher-layer signaling.

Preferably the obtainment unit 901 included in the apparatus illustrated in FIG. 9 or FIG. 10 is configured to receive configuration information transmitted from a base station in higher-layer signaling and/or downlink control signaling.

Preferably the obtainment unit 901 included in the apparatus illustrated in FIG. 9 or FIG. 10 is configured to obtain the at least two PUCCH transmission carriers including a first PUCCH transmission carrier, where the first PUCCH transmission carrier is an uplink primary carrier or a carrier with a largest coverage radius among a plurality of uplink carriers aggregated for a UE.

Preferably the obtainment unit 901 included in the apparatus illustrated in FIG. 9 or FIG. 10 is configured to obtain the at least two PUCCH transmission carriers corresponding respectively to different priorities, where the priority corresponding to the first PUCCH transmission carrier is the lowest.

Preferably the obtainment unit 901 included in the apparatus illustrated in FIG. 9 or FIG. 10 is configured to receive configuration transmitted from a base station, where the configuration information includes: information about a set of downlink carriers corresponding to each of the at least two PUCCH transmission carriers; and/or priority information corresponding respectively to the at least two PUCCH transmission carriers.

Preferably the PUCCH transmission carrier determination unit 902 included in the apparatus illustrated in FIG. 9 or FIG. 10 is further configured:

To select, from the at least two PUCCH transmission carriers, a PUCCH transmission carrier with the sub-frame n being an uplink sub-frame and with a highest priority as a PUCCH transmission carrier for transmission of response information, where the priorities are configured by a base station in higher-layer signaling or preset by the system; or To obtain sets of downlink carriers corresponding to respective PUCCH transmission carriers and to select, from the at least two PUCCH transmission carriers, a PUCCH transmission carrier, corresponding to the set of downlink carriers comprising carriers for which response information needs to be fed back in the sub-frame n and with a highest priority, as a PUCCH transmission carrier for transmission of response information, where the priorities are configured by a base station in higher-layer signaling or preset by the system; or To obtain sets of downlink carriers corresponding to the respective PUCCH transmission carriers, and when response information needs to be fed back in the sub-frame n for carriers in a set of downlink carriers, to determine the PUCCH transmission carriers corresponding to the sets of downlink carriers to be a PUCCH transmission carriers for transmission of response information.

Preferably the response information transmission unit 903 included in the apparatus illustrated in FIG. 9 or FIG. 10 is configured:

To adjust transmit power at which a PUCCH is transmitted over a determined PUCCH transmission carrier in the sub-frame n according to a received power adjustment indicator and transmit power at which a PUCCH was transmitted lastly over the corresponding PUCCH transmission carrier before the sub-frame n; and to transmit the response information over the determined PUCCH transmission carrier at the adjusted transmit power, where the power adjustment indicator is an indicator configured by a base station to adjust transmit power of a PUCCH in the sub-frame n.

The corresponding apparatus for transmitting response information in FIG. 9 or FIG. 10 can be located in a UE, and when the apparatus is located in a UE, it is generally configured to perform the procedure of transmitting response information by the UE based upon the configuration by the base station, which corresponds to the procedure of transmitting response information by the UE based upon the configuration by the base station according to the first embodiment above.

Figure 1:
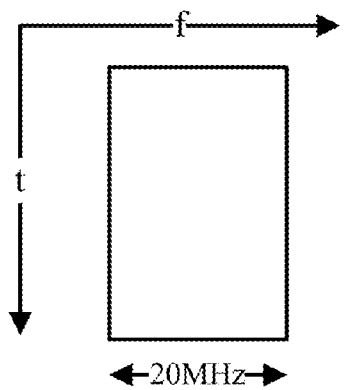
FIG. 1 is a schematic diagram of a carrier in the LTE system in the prior art.
Figure 2:
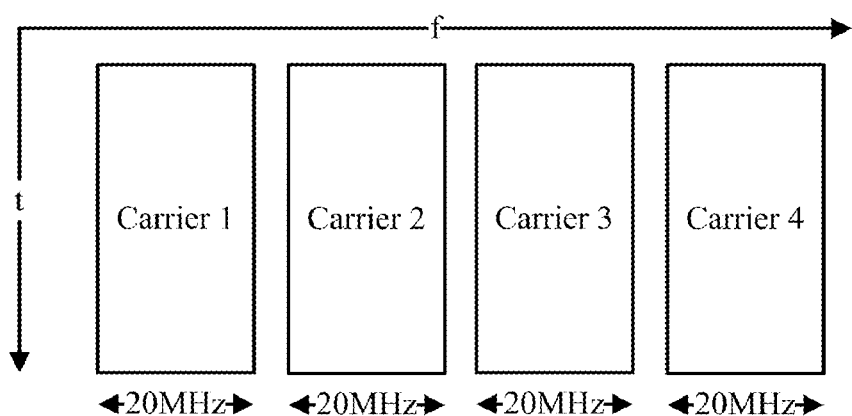
FIG. 2 is a schematic diagram of carrier aggregation in the LTE-A system in the prior art.

The corresponding apparatus for transmitting response information in FIG. 9 or FIG. 1.10 is further provided with functional modules to perform the corresponding steps in the procedure of transmitting response information by the UE based upon the configuration by the base station according to the first embodiment, so a repeated description thereof will be omitted here.

Figure 11:
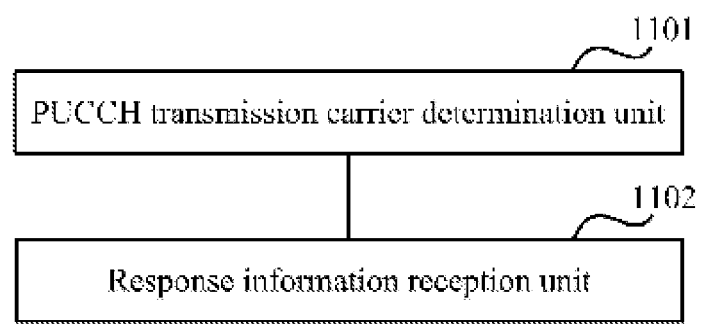
FIG. 11 is a further schematic structural diagram of an apparatus for transmitting response information according to the second embodiment of the invention.

FIG. 11 illustrates a schematic structural diagram of an apparatus for transmitting response information according to the second embodiment, and as illustrated in FIG. 11, the apparatus for transmitting response information generally includes:

A PUCCH transmission carrier determination unit 1101 and a response information reception unit 1102;

Where:

The PUCCH transmission carrier determination unit 1101 is configured to determine at least one Physical Uplink Control Channel (PUCCH) transmission carrier for transmission of response information by a UE, where the PUCCH transmission carrier for transmission of response information is determined from at least two PUCCH transmission carriers of which the UE is notified by a base station; and The response information reception unit 1102 is configured to receive the response information transmitted from the UE over the at least one PUCCH transmission carrier in a sub-frame n.

Preferably the response information reception unit 1102 included in the apparatus illustrated in FIG. 11 is configured:

To receive the response information over the PUCCH transmission carrier with the sub-frame n being an uplink sub-frame and with a highest priority among the at least two PUCCH transmission carriers, where the priorities are configured by the base station in higher-layer signaling or preset by the system; or When feedback response information corresponding to scheduled downlink data is transmitted in the sub-frame n, to receive the feedback response information over the PUCCH transmission carrier with the sub-frame n being an uplink sub-frame and with a highest priority among the at least two PUCCH transmission carriers, where the priorities are configured by the base station in higher-layer signaling or preset by the system; or To receive the response information over the PUCCH transmission carrier with a highest priority among PUCCH transmission carriers corresponding to sets of downlink carriers over which data transmission is scheduled and for which corresponding feedback response information is transmitted in the sub-frame n, where the priorities are configured by the base station in higher-layer signaling or preset by the system; or To receive the response information respectively over PUCCH transmission carriers corresponding to sets of downlink carriers over which data transmission is scheduled and for which corresponding feedback response information is transmitted in the sub-frame n.

The corresponding apparatus for transmitting response information in FIG. 11 can be located in a base station, and when the apparatus is located in the base station, it is generally configured to perform the procedure of base station receiving response information, which corresponds to the procedure of the base station receiving response information according to the first embodiment above.

The corresponding apparatus for transmitting response information in FIG. 11 is further provided with functional modules to perform the corresponding steps in the procedure of the base station receiving response information according to the first embodiment, so a repeated description thereof will be omitted here.

It shall be noted that the units in the corresponding apparatuses for transmitting response information in FIG. 8 to FIG. 11 are only units into which the apparatus is functionally divided, and in a practical application, the units above can be integrated or subdivided. Moreover the functions performed by the apparatuses for transmitting response information according to the embodiment above correspond to the flows of the methods of transmitting response information according to the first embodiment above, and further detailed processing flows performed by the apparatuses have been described in details in the first embodiment above, so a repeated description thereof will be omitted here.

Third Embodiment

The third embodiment provides a system for transmitting response information, and with the system, the number of reconfiguration operations on a UE by a base station can be lowered.

Figure 12:
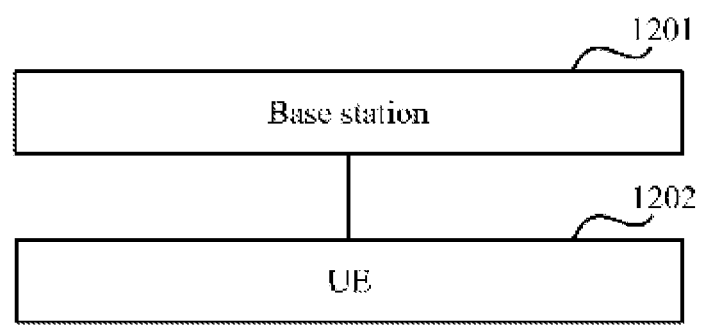
FIG. 12 is a schematic diagram of a system for transmitting response information according to a third embodiment of the invention.

FIG. 12 illustrates a schematic diagram of a system for transmitting response information according to the third embodiment, and as illustrated in FIG. 12, the system for transmitting response information generally includes:

A base station 1201 and a UE 1202, where:

The base station 1201 is configured to determine at least two Physical Uplink Control Channel (PUCCH) transmission carriers, to notify the UE of the at least two PUCCH transmission carriers, to determine configuration information for PUCCH transmission by the UE 1202, to transmit the configuration information to the UE and to receive response information transmitted from the UE in at least one of the PUCCH transmission carriers in a sub-frame n; and The UE 1202 is configured to obtain the at least two PUCCH transmission carriers, to determine the at least one of the at least two PUCCH transmission carriers in the sub-frame n for transmission of response information and to transmit the response information over the determined PUCCH transmission carrier in the sub-frame n.

In the system illustrated in FIG. 12, the base station 1201 can correspond to the corresponding apparatuses for transmitting response information in FIG. 8 and FIG. 11 according to the second embodiment above, that is, the base station 1201 can include the corresponding apparatus in FIG. 8 and/or FIG. 11, and reference can be made to the description in the second embodiment above for detailed functions performed by the base station 1201, so a repeated description thereof will be omitted here.

In the system illustrated in FIG. 12, the UE 1202 can correspond to the corresponding apparatuses for transmitting response information in FIG. 9 and FIG. 10 according to the second embodiment above, that is, the UE 1202 can include the corresponding apparatus in FIG. 9 and/or FIG. 10, and reference can be made to the description in the second embodiment above for detailed functions performed by the UE 1202, so a repeated description thereof will be omitted here.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method of receiving response information, comprising:
    determining, by a base station, at least two Physical Uplink Control Channel (PUCCH) transmission carriers and notifying a User Equipment (UE) of the at least two PUCCH transmission carriers, wherein the at least two PUCCH transmission carriers comprise a first PUCCH transmission carrier, which is a carrier with a largest coverage radius among a plurality of uplink carriers aggregated for the UE, and the at least two PUCCH transmission carriers correspond to different priorities, the priority of the first PUCCH transmission carrier being the lowest;
    determining, by the base station, configuration information for PUCCH transmission by the UE and transmitting the configuration information to the UE; and
    receiving, by the base station, in a sub-frame n, response information transmitted from the UE over at least one of the at least two PUCCH transmission carriers; and
    wherein receiving, by the base station, in the sub-frame n, the response information transmitted from the UE over the at least one PUCCH transmission carrier comprises:
        when feedback response information corresponding to scheduled downlink data is transmitted in the sub-frame n, the base station receiving the feedback response information over the PUCCH transmission carrier with the sub-frame n being an uplink sub-frame and with a highest priority among the at least two PUCCH transmission carriers, wherein the priorities are configured by the base station in higher-layer signaling or preset by a system;
        the base station receiving feedback response information over the PUCCH transmission carrier with a highest priority among PUCCH transmission carriers corresponding to sets of downlink carriers over which data transmission is scheduled and for which corresponding feedback response information is transmitted in the sub-frame n, wherein the priorities are configured by the base station in higher-layer signaling or preset by a system; or
        the base station receiving the response information respectively over PUCCH transmission carriers corresponding to sets of downlink carriers over which data transmission is scheduled and for which corresponding feedback response information is transmitted in the sub-frame n,
    wherein the method further comprises:
    configuring and transmitting a power adjustment indicator to the UE.

2. The method according to claim 1, wherein notifying, by the base station, the UE of the at least two PUCCH transmission carriers comprises:
    notifying, by the base station, the UE of the at least two PUCCH transmission carriers in higher-layer signaling.

3. The method according to claim 1, wherein transmitting, by the base station, the configuration information to the UE comprises:
    transmitting, by the base station, the configuration information to the UE in higher-layer signaling and/or downlink control signaling.

4. The method according to claim 1, wherein the configuration information comprises:
    information about a set of downlink carriers corresponding to each of the at least two PUCCH transmission carriers; and/or
    priority information corresponding respectively to the at least two PUCCH transmission carriers.

5. A method of transmitting response information, comprising:
    obtaining, by a User Equipment (UE), at least two Physical Uplink Control Channel (PUCCH) transmission carriers, wherein the at least two PUCCH transmission carriers comprise a first PUCCH transmission carrier, which is a carrier with a largest coverage radius among a plurality of uplink carriers aggregated for the UE, and the at least two PUCCH transmission carriers correspond to different priorities, the priority of the first PUCCH transmission carrier being the lowest;
    determining, by the UE, at least one of the at least two PUCCH transmission carriers in a sub-frame n for transmission of response information;
    receiving an indicator from the base station and adjusting transmit power of the PUCCH;
    transmitting, by the UE, the response information over the determined PUCCH transmission carrier in the sub-frame n at n adjusted transmit power; and wherein determining, by the UE, the at least one of the at least two PUCCH transmission carriers in the sub-frame n for transmission of response information comprises:
  selecting, from the at least two PUCCH transmission carriers, a PUCCH transmission carrier with the sub-frame n being an uplink sub-frame and with a highest priority as a PUCCH transmission carrier for transmission of response information;
  obtaining, by the UE, sets of downlink carriers corresponding to respective PUCCH transmission carriers and selecting, from the at least two PUCCH transmission carriers, a PUCCH transmission carrier, corresponding to the set of downlink carriers comprising carriers for which response information needs to be fed back in the sub-frame n and with a highest priority, as a PUCCH transmission carrier for transmission of response information; or
  obtaining, by the UE, sets of downlink carriers corresponding to respective PUCCH transmission carriers, and when response information needs to be fed back in the sub-frame n for carriers in a set of downlink carriers, determining the PUCCH transmission carriers corresponding to the set of downlink carriers to be a PUCCH transmission carrier for transmission of response information;
  wherein the priorities of the PUCCH transmission carriers are determined according to configuration information transmitted from a base station or preset by a system.

6. The method according to claim 5, wherein before the response information is transmitted over the determined PUCCH transmission carrier in the sub-frame n, the method further comprises:
  receiving, by the UE, configuration information transmitted from a base station, wherein the configuration information comprises PUCCH resources over the PUCCH transmission carriers; and/or
  determining, by the UE, PUCCH resources over the PUCCH transmission carriers according to Control Channel Element (CCE) indexes, wherein the CCE indexes are indexes of CCEs occupied by a Physical Downlink Control Channel (PDCCH) by which the base station schedules a Physical Downlink Shared Channel (PDSCH).

7. The method according to claim 5, wherein before the UE determines at least one of the at least two PUCCH transmission carriers in the sub-frame n for transmission of response information, the method further comprises:
  determining, by the UE, sub-frames to transmit response information corresponding to respective downlink sub-frames over each downlink carrier, wherein different downlink carriers correspond to one or more response information feedback timing relationships.

8. The method according to claim 5, wherein the obtaining, by the UE, the at least two PUCCH transmission carriers comprises: receiving, by the UE, the at least two PUCCH transmission carriers notified of by a base station in higher-layer signaling.

9. The method according to claim 5, wherein the method further comprises:
  receiving, by the UE, configuration information transmitted from the base station, wherein the configuration information comprises:
  information about a set of downlink carriers corresponding to each of the at least two PUCCH transmission carriers; and/or
  priority information corresponding respectively to the at least two PUCCH transmission carriers.

10. An apparatus for receiving response information, comprising:
  a processor and a transceiver;
  the processor configured to determine at least two Physical Uplink Control Channel (PUCCH) transmission carriers, to notify a User Equipment (UE) of the at least two PUCCH transmission carriers determined, and to determine configuration information for PUCCH transmission by the UE, wherein the at least two PUCCH transmission carriers comprise a first PUCCH transmission carrier, which is a carrier with a largest coverage radius among a plurality of uplink carriers aggregated for the UE, and the at least two PUCCH transmission carriers correspond to different priorities, the priority of the first PUCCH transmission carrier being the lowest;
  the transceiver configured to transmit the configuration information determined to the UE;
  the processor further configured to determine at least one of the at least two PUCCH transmission carriers for transmission of response information by a UE, and configure a power adjustment indicator; and
  the transceiver further configured to receive the response information transmitted from the UE over the at least one PUCCH transmission carrier in a sub-frame n, and transmit the power adjustment indicator to the UE;
  wherein the transceiver is configured to at least one of:
    when feedback response information corresponding to scheduled downlink data is transmitted in the sub-frame n, to receive the feedback response information over the PUCCH transmission carrier with the sub-frame n being an uplink sub-frame and with a highest priority among the at least two PUCCH transmission carriers, wherein the priorities are configured by the base station in higher-layer signaling or preset by a system;
    to receive the response information over the PUCCH transmission carrier with a highest priority among PUCCH transmission carriers corresponding to sets of downlink carriers over which data transmission is scheduled and for which corresponding feedback response information is transmitted in the sub-frame n, wherein the priorities are configured by the base station in higher-layer signaling or preset by a system; or
    to receive the response information respectively over PUCCH transmission carriers corresponding to sets of downlink carriers over which data transmission is scheduled and for which corresponding feedback response information is transmitted in the sub-frame n.

11. The apparatus according to claim 10, wherein the processor is configured to determine information about a set of downlink carriers corresponding to each of the at least two PUCCH transmission carriers; and/or to determine priority information corresponding respectively to the at least two PUCCH transmission carriers.

12. An apparatus for transmitting response information, comprising:
  a processor and a transceiver
  the processor configured to obtain at least two Physical Uplink Control Channel (PUCCH) transmission carriers, and to determine at least one of the at least two PUCCH transmission carriers obtained in a sub-frame n for transmission of response information, and to receive an indicator from the base station and to adjust a transmit power of the PUCCH;
wherein the at least two PUCCH transmission carriers comprise a first PUCCH transmission carrier, which is a carrier with a largest coverage radius among a plurality of uplink carriers aggregated for the UE, and the at least two PUCCH transmission carriers correspond to different priorities, the priority of the first PUCCH transmission carrier being the lowest; and the transceiver configured to transmit the response information over the PUCCH transmission carrier determined in the sub-frame n;
wherein at an adjusted transmit power;
wherein the processor is configured to determine the at least one of the at least two PUCCH transmission carriers in the sub-frame n for transmission of response information, by:
selecting, from the at least two PUCCH transmission carriers, a PUCCH transmission carrier with the sub-frame n being an uplink sub-frame and with a highest priority as a PUCCH transmission carrier for transmission of response information;
obtaining, by the UE, sets of downlink carriers corresponding to respective PUCCH transmission carriers and selecting, from the at least two PUCCH transmission carriers, a PUCCH transmission carrier, corresponding to the set of downlink carriers comprising carriers for which response information needs to be fed back in the sub-frame n and with a highest priority, as a PUCCH transmission carrier for transmission of response information; or
obtaining, by the UE, sets of downlink carriers corresponding to respective PUCCH transmission carriers, and when response information needs to be fed back in the sub-frame n for carriers in a set of downlink carriers, determining the PUCCH transmission carriers corresponding to the set of downlink carriers to be a PUCCH transmission carrier for transmission of response information;
wherein the priorities of the PUCCH transmission carriers are determined according to configuration information transmitted from a base station or preset by a system.

13. The apparatus according to claim 12, wherein the processor is further configured to receive configuration transmitted from a base station, wherein the configuration information comprises: information about a set of downlink carriers corresponding to each of the at least two PUCCH transmission carriers; and/or priority information corresponding respectively to the at least two PUCCH transmission carriers.

* * * * *